Nov. 16, 1965  R. W. BATTEN  3,217,571
FASTENER INSTALLATION TOOL
Filed April 25, 1962

INVENTOR.
RONALD W. BATTEN
BY
ATTORNEYS.

United States Patent Office 3,217,571
Patented Nov. 16, 1965

3,217,571
FASTENER INSTALLATION TOOL
Ronald W. Batten, Torrance, Calif., assignor to Hi-Shear Corporation, Torrance, Calif., a corporation of California
Filed Apr. 25, 1962, Ser. No. 190,104
4 Claims. (Cl. 81—55)

This invention relates to tools for setting fasteners.

Many types of fasteners are set by imparting relative rotation between two elements thereof, which occasions a simultaneous axial movement between the same elements. An example of one of this type of fastener is shown in the presently co-pending application of George S. Wing and Michael M. Schuster, Serial No. 75,744, filed December 14, 1960, now Patent No. 3,129,630, entitled "Blind Fastener," which is assigned to the same assignee as the instant application. A tool for setting this type of fastener must be able to grasp two elements of the fastener and turn them, while simultaneously backing off with one of its elements.

The fastener shown in the aforesaid application, which is typical of fasteners involving the requirements of simultaneous rotational and axial movement between the elements of a fastener, includes an exterior sleeve which has a head at one end and an exterior taper at its other end. An internally threaded bore passes through the length of this sleeve. A mandrel is threaded into the sleeve, the mandrel including a head on the end which is adjacent to the tapered end of the sleeve. A collar surrounds the mandrel, and when the mandrel is turned in the sleeve, it is pushed up over the tapered sleeve to form an expanded head. There is thus provided a blind fastener which can be installed from one side of the work. The mandrel usually is provided with a break neck section which is adapted to torque off when the collar has been appropriately set. It is a requirement of fasteners of this class that enough torque be exerted to pull the collar up over the sleeve, but that the amount of torque so required must not exceed that which is required to shear the mandrel at the break neck section. Furthermore, the axial load, which remains in the fastener after the break neck section shears, is also a matter of some importance with respect to the permanence and fatigue resistance of the joint produced by the fastener.

In many previously known types of drivers, that portion of the driver which shifts axially relative to the other part of the driver, has been keyed to one part, whereby the axial sliding movement involves not only the force reactions inherent within the fastener, but also a relatively unpredictable friction reaction within the driver itself. A large amount of energy is dissipated in such friction and the greater the torque, the greater the dissipated energy. While this energy may seem small compared with the total energy available from the tool, it must be realized that in this type of device, considerable force is needed for the proper torquing off of the mandrel; that is, something on the order of a fly wheel effect is required in the tool. This type of tool ordinarily utilizes a small hand-held air-powered motor whose physical size and weight must be kept optimally small because it is carried by workmen all day long. Therefore, any feature which increases the dissipation of energy also decreases the effectiveness of the tool, and, in fact, has redered some installing tools borderline in their performance. However, introducing excess capacity for the tool has the undesired side effect of enlarging a tool which must be carried by workmen all day long.

Also, friction forces within the tool constitute forces which are transmitted to the workman, and he must resist them, thereby tiring him sooner.

It is an object of this invention to provide a driving tool for setting fasteners wherein counter-rotated forces can be exerted, together with means for axially backing off a driver member which is substantially frictionless, and which therefore does not dissipate energy which ought to be made available for its fly wheel or power effect in the setting of the fastener, and which also reduce the forces which the operator has to resist. It also eliminates from the system involving the fastener and the tool for setting the same a relatively unpredictable force created by frictional engagements. It has been found in actual practice that the tool of this invention results in a much more effective installation tool, permitting larger fasteners to be driven with tools of the same bulk and power rating, and enabling the operator to use it with less effort and fatigue.

This invention is carried out in combination with a motor having a housing and a drive shaft, to both of which the device is attached. This device includes a housing, one portion of which is attached to the motor housing and which carries on it a rotatable driver engaged by the drive shaft. Within the driver housing there is disposed a fastener-engaging means which is rotatably and axially reciprocable in the housing and which is driven by the driver. Between the driver and the fastener-engaging means, there is disposed bearing means which engage the driver and the fastener-engaging means for driving the same in unison, and which permit axial sliding between the same.

According to a preferred but optional feature of the invention, the bearing means comprises a roller bearing journaled to the fastener-engaging means and in which the driver includes an axially extending planar track along which the bearing can roll to provide for the axial shifting motion and against which it can bear to cause the rotary motion.

The above and other features of this invention will be fully understood from the following detailed description and the accompanying drawings in which.

Figure 1:
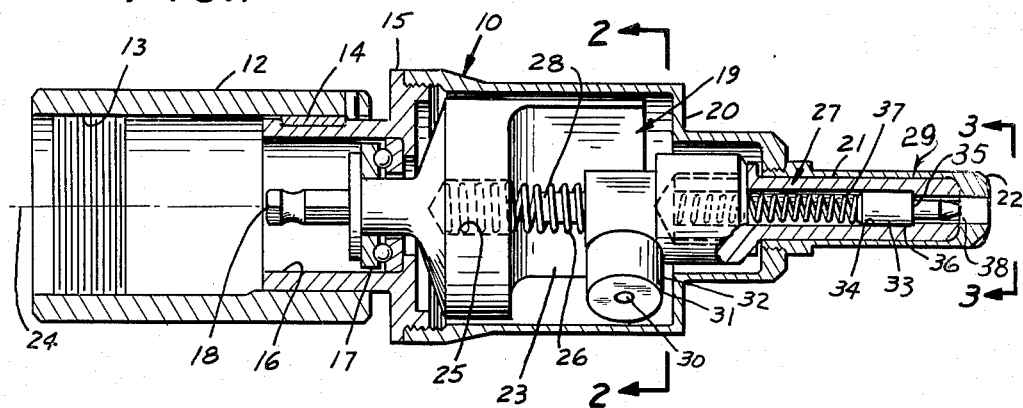
FIG. 1 is a side elevation partly in cutaway cross-section showing the presently prefered embodiment of the invention.

The presently preferred embodiment of the invention is shown in FIG. 1. It includes a housing 10 with an adapter 12, which is provided with threads 13 for attachment to the body of a motor (not shown). A key 14 joins the adapter to a body 15, the body having a passage 16 which encloses a bearing 17. The bearing supports a shaft 18. The shaft 18 is an integral part of a driver 19. Attaching the shaft 18 to the rotary portion of the motor will cause the driver 19 to be rotated relative to the body. The body has an extension 20 which substantialy surrounds it. The extension has threaded to it a nose portion 21 with six blades 22 on the end thereof. These blades are intended to be inserted into matching recesss in one portion of a fastener of the type shown in the aforesaid co-pending patent application and constitute one set of fastener-engaging means.

The driver further has a milled-out section which forms a track 23 which is planar and parallel to the central axis of rotation 24 of the tool. A bore 25 forms a seat for coil spring 26, which extends axially and abuts against a fastener-engaging member 27. A post 28 extends axially from member means 27 in order to support spring 26 along the axis.

Fastener-engaging means 27 includes a cylindrical nose portion 29 which is journaled inside the nose portion 21 and is both rotatable and axially reciprocable therein. To its outside periphery, there is attached a post 30 which serves as a support for a bearing 31. The bearing includes a cylindrical surface 32 adapted to roll axially along the track, as can best be seen in FIG. 2. The bearing therefore constitutes a bearing means disposed between a surface, such as post 30 on fastener-engaging means 27, and another surface, i.e. track 23 on the driver. The bearing means is adapted to move axially relative to the housing or body, and also to abut the same to constrain the driver and the fastener-engaging means to rotate together.

An ejector 33 is fitted inside an ejector passage 34 within the fastener-engaging means 27. It includes a shoulder 35 engageable with shoulder 36 on the fastener-engaging means, which limits the movement to the right of ejector 33 with respect to FIG. 1. A spring 37 biases the ejector to the right.

The operation of the device of FIG. 1 will be evident from the drawings. With the drive motor attached to the adapter and to shaft 18, the driver can be rotated relative to the housing and nose portion. As soon as the track 23 is brought into contact with bearing 31, then the driver and fastener-engaging means are turned simultaneously. The threaded movement of the mandrel of the fastener relative to its surrounding sleeve causes the fastener-engaging means to move to the left in FIG. 1, which movement is permitted because of the rolling motion of bearing 31 along the track, which involves a negligible friction reaction.

Fastener-engaging means 27 includes a hexagonally prismatic set of wrench-engaging surfaces 38 which engage the mandrel to cause this rotation. It will be understood that the wrench-engaging means on this device may be modified to engage any other type of engagement means, such as splines, sockets, etc.

When a portion of the mandrel has finally been torqued off, its loose part is momentarily lodged inside passage 34, and is ejected therefrom by ejector 33.

This invention thereby provides a substantially friction-free means for permitting relative axial motion between portions of a driver which are concurrently being driven rotationally.

Figure 2:
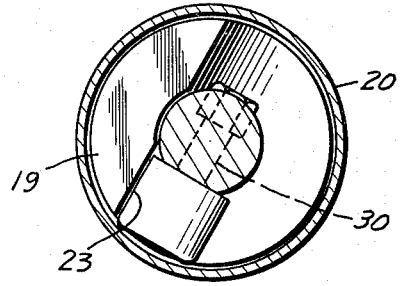
FIG. 2 is a cross-section taken at line 2—2 of FIG. 1.
Figure 3:
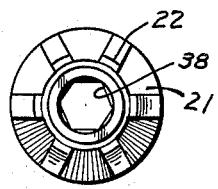
FIG. 3 is a right-hand end view taken at line 3—3 of FIG. 1.

It will be noted that were the rotation of the shaft reversed in FIG. 2, the other side of track 23 would then come into contact with the bearing, so that the tool can drive in either direction. It is evident that more than one bearing might be provided, so that the device would not rotate a full 180° before a bearing again came into contact with the track.

Also, the bearing could be attached to the driver, and the track disposed on the fastener-engaging means, if preferred.

This invention is not to be limited by the embodiment shown in the drawings and described in the description which are given by way of example and not of limitation, but only in accordance with the scope of the appended claims.

I claim:

1. In a fastener-installing tool of the type which includes driver means rotatable about a central axis by a motor, and fastener-engaging means having fastener-engaging surfaces rotatable about said central axis and reciprocable along said central axis relative to the driver means, the improvement comprising: roller bearing means mounted on a centrally-extending portion of said fastener-engaging means, and being axially spaced from said fastener-engaging surfaces and an axially extending track on said driver means, the bearing means rolling along the track to permit relative axial movement between the driver and fastener-engaging means, and engaging the track to constrain the members to simultaneous rotation in at least one direction of motor rotation.

2. Apparatus according to claim 1 in which said roller bearing means has an axis normal to said central axis, and in which the track consitutes a substantially planar surface extending parallel to the central axis.

3. Apparatus according to claim 1 in which an ejector is provided in said fastener-engaging means for ejecting a torqued-off section of the fastener from the fastener-engaging means.

4. Apparatus according to claim 1 in which the bearing means comprises a roller bearing which is mounted to one of said other means, said roller bearing having an axis of rotation normal to said central axis, in which the track constitutes a substantially planar surface extending parallel to the central axis on the remaining one of said other means, in which the fastener-engaging means includes fastener-engaging surfaces forming a cavity, there being a passage through the fastener-engaging means into the cavity, in which an ejector passes through the passage for ejecting a torqued-off section of the fastener from the fastener-engaging means, in which a first spring biases apart the driver means and fastener-engaging means, and in which a second spring biases the ejector relative to the fastener-engaging means to force the ejector into said cavity.

References Cited by the Examiner

UNITED STATES PATENTS

| 2,050,497 | 8/1936 | McCollum. | |
| 2,284,199 | 5/1942 | Greiner | 64—23 |
| 2,789,597 | 4/1957 | La Torre | 81—55 X |
| 2,953,049 | 8/1960 | Vilmerding | 81—124.1 X |
| 3,028,777 | 4/1962 | Essex | 81—55 |
| 3,041,902 | 7/1962 | Wing | 81—56 |

WILLIAM FELDMAN, *Primary Examiner.*

JAMES L. JONES, JR., *Examiner.*